(12) United States Patent
Neumann

(10) Patent No.: US 8,106,768 B2
(45) Date of Patent: Jan. 31, 2012

(54) METHOD OF OPERATING A SELF-POWERED HOME AUTOMATION SENSOR DEVICE FOR DETECTING THE EXISTENCE OF AND/OR FOR MEASURING THE INTENSITY OF A PHYSICAL PHENOMENON

(75) Inventor: Alexander Neumann, Tübingen (DE)

(73) Assignee: Somfy Sas, Cluses (FR)

( * ) Notice: Subject to any disclaimer, the term of this patent is extended or adjusted under 35 U.S.C. 154(b) by 882 days.

(21) Appl. No.: 11/879,445

(22) Filed: Jul. 17, 2007

(65) Prior Publication Data

US 2008/0017726 A1    Jan. 24, 2008

(30) Foreign Application Priority Data

Jul. 19, 2006  (FR) ...................... 06 06560

(51) Int. Cl.
*G08B 1/08* (2006.01)
*G05B 13/02* (2006.01)
*G08C 17/00* (2006.01)
*H02J 7/00* (2006.01)
*H01M 10/44* (2006.01)
*H01M 10/46* (2006.01)

(52) U.S. Cl. ................. 340/539.26; 340/539.3; 340/3.1; 370/311; 320/101

(58) Field of Classification Search ............ 340/539.26, 340/539.3, 3.1; 370/311; 320/101
See application file for complete search history.

(56) References Cited

U.S. PATENT DOCUMENTS

| | | | |
|---|---|---|---|
| 3,979,656 A * | 9/1976 | Takeda et al. ................. | 320/101 |
| 4,266,178 A * | 5/1981 | Asakawa ...................... | 320/101 |
| 4,644,990 A * | 2/1987 | Webb et al. ........................ | 160/5 |
| 4,695,785 A | 9/1987 | Mieth et al. | |
| 5,413,161 A * | 5/1995 | Corazzini ......................... | 160/7 |
| 5,760,558 A * | 6/1998 | Popat .............................. | 318/480 |
| 6,023,223 A * | 2/2000 | Baxter, Jr. ...................... | 340/531 |
| 2003/0002465 A1 * | 1/2003 | Glendining et al. .......... | 370/337 |
| 2003/0069670 A1 * | 4/2003 | Osinga .......................... | 700/275 |
| 2003/0131274 A1 * | 7/2003 | Mizuyabu et al. ............ | 713/324 |

(Continued)

FOREIGN PATENT DOCUMENTS

DE    299 23 046 U1    4/2000

(Continued)

OTHER PUBLICATIONS

Leder, Erich et al.: "Solar Powered Low-Power Sensor Module with a Radio Communication and a User Interface", *IEEE*, 2005, pp. 440-443.

*Primary Examiner* — Jennifer Mehmood
*Assistant Examiner* — Andrew Bee
(74) *Attorney, Agent, or Firm* — Frommer Lawrence & Haug LLP; Ronald R. Santucci

(57) ABSTRACT

The method of operation applies to a self-powered home automation sensor device for detecting the existence of and/or for measuring the intensity of a first physical phenomenon, comprising a means of converting an effect of a second physical phenomenon into electrical energy and a means of determining the instantaneous power of this second physical phenomenon that can be converted into electrical energy, wherein a normal, first mode of operation of the device or an energy-saving second mode of operation of the device is activated according to a value defined on the basis of the determination of the instantaneous power that can be converted into electrical energy.

12 Claims, 2 Drawing Sheets

U.S. PATENT DOCUMENTS

| | | | |
|---|---|---|---|
| 2003/0140706 A1* | 7/2003 | Tsuji | 73/753 |
| 2005/0030177 A1 | 2/2005 | Albsmeier et al. | |
| 2005/0156751 A1 | 7/2005 | Seyfang et al. | |
| 2006/0148410 A1 | 7/2006 | Nelson et al. | |
| 2006/0185727 A1* | 8/2006 | Matan | 136/293 |
| 2007/0069879 A1* | 3/2007 | Kuchler | 340/447 |

FOREIGN PATENT DOCUMENTS

| | | |
|---|---|---|
| JP | 2-091348 | 3/1990 |
| JP | 2004-288092 A | 10/2004 |
| WO | WO 03/056279 | 7/2003 |
| WO | WO 2005/114610 | 12/2005 |

\* cited by examiner

| Function | Mode 1 | Mode 2 |
|---|---|---|
| Measurement | Periodic, t₁ | Periodic, t₂ ≥ t₁ |
| Status signal | Periodic, T₁ | Periodic, T₂ ≥ T₁ |
| Charge via a step-up converter | Activated if the charge is above a threshold, otherwise deactivated | Deactivated |
| Threshold measurement | Periodic, T₁ | Periodic, T₂ ≥ T₁ |

METHOD OF OPERATING A SELF-POWERED HOME AUTOMATION SENSOR DEVICE FOR DETECTING THE EXISTENCE OF AND/OR FOR MEASURING THE INTENSITY OF A PHYSICAL PHENOMENON

This application claims priority benefits from French Patent Application No. FR 06 06560 filed Jul. 19, 2006, the disclosure of which is hereby incorporated by reference.

BACKGROUND OF THE INVENTION

The invention relates to a self-powered home automation sensor device for measuring the intensity of a physical phenomenon and intended in particular for controlling a motorized solar protection device such as especially an awning or a roller blind.

BRIEF DESCRIPTION OF THE PRIOR ART

It is known to use a motorized solar protection device to regulate the penetration of solar rays into a building through a window. In the case of automatic control, a luminosity sensor is provided for transmitting control signals to the motorized solar protection device so as to move a movable element in order to obtain a specified level of comfort. To reduce the wiring constraints of the installation, it is known to provide means for wireless communication between the sensor and the solar protection device. For the purpose of further limiting wiring constraints, it is known to use sensors that are self-powered. These self-powered sensors comprise a means of storing electrical energy, such as a battery, and optionally means for converting energy (for example solar energy) into electrical energy.

A method of operating an installation in which a sensor periodically transmits a status signal so as to fulfill a security function, is known from application JP 02-091348. The periodic reception of this signal by a home automation device ensures the latter that the sensor is operational. If the status signal is not received, the home automation device is placed in safe mode.

The main problem with these self-powered sensors relates to energy control. In particular, it is necessary to ensure a sufficiently long operating life even when the conditions external to the device are such that practically no energy can be converted into electrical energy (for example at night in the case of sensor devices comprising a photovoltaic panel). Solutions to this problem rely on minimizing the consumption of electrical energy and on optimizing the charge of electrical energy reserves. The structure of the devices must nevertheless be simple, inexpensive and compact.

In addition, it is important that new sensors, with a low energy consumption, be compatible with existing receivers.

Various methods for saving energy in self-powered home automation sensor devices are known.

For example, WO 2005/114610 teaches a method in which a home automation sensor device transmits information in a discrete manner by minimizing the ratio of the periods of transmission to the periods separating two transmission periods. This consequently reduces the energy consumption.

Document US 2005/0030177 teaches a home automation sensor device in which the information transmission frequency depends on the level of charge of its battery.

Document DE 29 923 046 also teaches a self-powered home automation sensor device, which emits a warning signal when the level of energy contained in its batteries drops below a specified threshold.

Also known, from the document "*Solar-powered low-powered sensor module with radio communication and a user interface*" and document US 2006/148410, are self-powered sensor devices supplied by photovoltaic panels.

In all these documents, energy management is not optimal.

SUMMARY OF THE INVENTION

The object of the invention is to provide a method of operating a self-powered home automation sensor device that alleviates the abovementioned drawbacks. In particular, the invention proposes an operating method allowing better management of the energy resources by better anticipation of the variations in the amounts of energy that can be converted into electrical energy.

The operating method according to the invention is defined by claim 1.

Various ways of implementing the method according to the invention are defined by dependent claims 2 to 10.

The self-powered home automation sensor device according to the invention is defined by claim 11.

BRIEF DESCRIPTION OF THE DRAWING

The appended drawing shows, by way of examples, one embodiment of a self-powered home automation sensor device according to the invention and one way of implementing a method of operating such a device.

DESCRIPTION OF THE PREFERRED EMBODIMENTS

Figure 1:
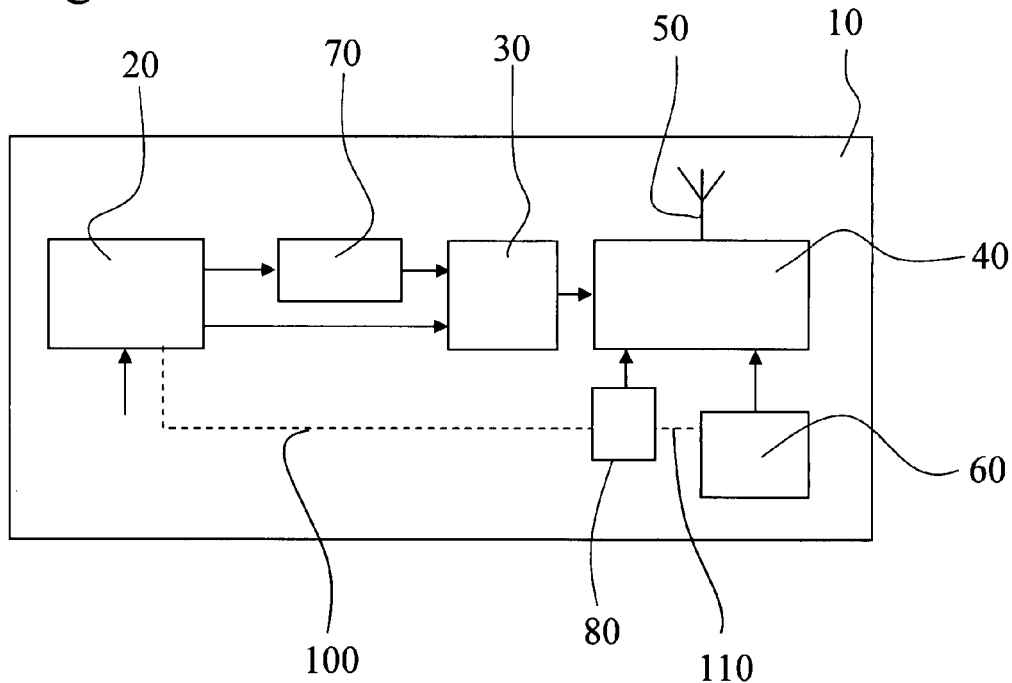
FIG. 1 is a block diagram of one embodiment of a self-powered home automation sensor device according to the invention.

The self-powered home automation sensor device 10 shown in FIG. 1 makes it possible to detect a physical phenomenon and/or to measure the intensity of a physical phenomenon, it being possible in particular for this physical phenomenon to be illumination, wind or mechanical vibration. It comprises mainly a means 20 for converting non-electrical energy into electrical energy, a means 30 for storing electrical energy, a microcontroller 40, an electromagnetic signal transmitter 50 (for example a radio transmitter), a detection means 60, a voltage converter 70 and a means 80 for determining the instantaneous power that can be converted into electrical energy.

The energy conversion means may use energy such as provided by light, heat, a vibration, a movement, an electromagnetic wave or any other form of energy available in a building or nearby the latter, in order to convert it into electrical energy. Preferably, light is converted into electrical energy and a photovoltaic cell is used for this purpose. Preferably, the electrical energy storage means comprises a capacitor or a battery. It is also possible to use several capacitors. The microcontroller includes software modules defining the operation of the self-powered home automation sensor device. Preferably, the microcontroller is of the type with a low energy consumption. For example, it may be switched into a standby mode and can operate with various clock frequencies. An auxiliary microcontroller may optionally be provided in order to drive the transmitter 50. In this case, the auxiliary microcontroller may be integrated into the transmitter.

Preferably, the transmitter is of the radiofrequency type, transmitting radio waves at a frequency between 30 MHz and 2.4 GHz. It regularly transmits a status signal, providing information about the state of operation of the self-powered home automation device irrespective of the home automation system of which this device forms part. Each transmitted signal preferably comprises a plurality of frames each containing the same information so as to ensure proper transmission of this information despite any electromagnetic interference. Preferably, these frames also include an identifier.

The detection means 60 comprises one or more sensors. In a preferred embodiment, at least one of the sensors constitutes, or forms part of, the means for determining the instantaneous power that can be converted into electrical energy. For example, if the energy conversion means 20 enables solar energy to be transformed into electrical energy, one of the sensors detects or measures a luminosity. Other parameters of physical phenomena that it is possible to detect or measure, thanks to additional sensors, are in particular the speed of the wind, the direction of the wind, the temperature, the presence of rain, the presence of snow, pressure, moisture, the presence of fire, the presence of smoke, the presence of a user, the quality of the air, the fracture of a window and the concentration of gas (for example carbon dioxide, carbon monoxide, oxygen or volatile organic compounds).

In addition to periodically transmitting a status signal, the self-powered home automation sensor device transmits, using its transmitter, a signal relating to data delivered by the sensor or sensors. This signal may include the absolute values of the intensities of the measured physical phenomena. It may also include logic information relating to these physical phenomena (for example the presence or absence of smoke, a temperature below or above a fixed threshold). In the case of logic information relating to a value below or above a fixed threshold, the signal may be sent only when the value has remained below or above the threshold for a predetermined time. These thresholds may advantageously be adjusted by the user. Preferably, the self-powered home automation sensor device includes a voltage converter of the step-up type so as to adapt the output voltage of the energy conversion means to that required to charge the storage means. Depending on the charge of the storage means, it is preferable not to use the voltage converter. The microcontroller preferably has means for activating or deactivating the voltage converter depending on the charge of the storage means.

One output of a sensor of the detection means 60 is connected to the microcontroller. Thus, depending on the signal transmitted by this sensor to the microcontroller, the latter executes a first software module defining a first mode of operation of the self-powered home automation sensor device or a second software module defining a second mode of operation of the self-powered home automation sensor device. If the conversion means is a photovoltaic cell, the signal transmitted to the microcontroller includes information about the intensity of the illumination. This information is compared with a threshold, in order to activate, or not, the first or second mode of operation. In both modes, substantially the same functions are provided for. However, the second mode of operation allows greater energy savings to be made. These energy savings are of course achieved by limiting the electrical consumption of the device in the second mode compared with what this device consumes in the first mode, all other things being equal. In particular, the electrical consumption of the microcontroller 40 and/or the electrical consumption of the transmitter 50 and/or the electrical consumption of the voltage conversion means 70 are limited in this second mode. It is also possible to limit the electrical consumption of any other electrical energy-consuming means of the device. To do this, several of the following actions may be carried out, simultaneously or not:

the period between two status signal transmissions is extended, that is to say the frequency with which these status signals are transmitted is reduced;

the number of frames transmitted in each status signal is reduced;

the period between two data signal transmissions is increased, that is to say the frequency with which data signals are transmitted is reduced;

the microcontroller operates at various frequencies depending on the function provided by the self-powered home automation sensor device (measurement, transmission); and the energy conversion means supplies the storage means directly.

All these actions, carried out individually, make it possible to limit the electrical consumption of the device. Furthermore, any combination of a number of these actions may also limit the electrical consumption of the device.

Figure 2:
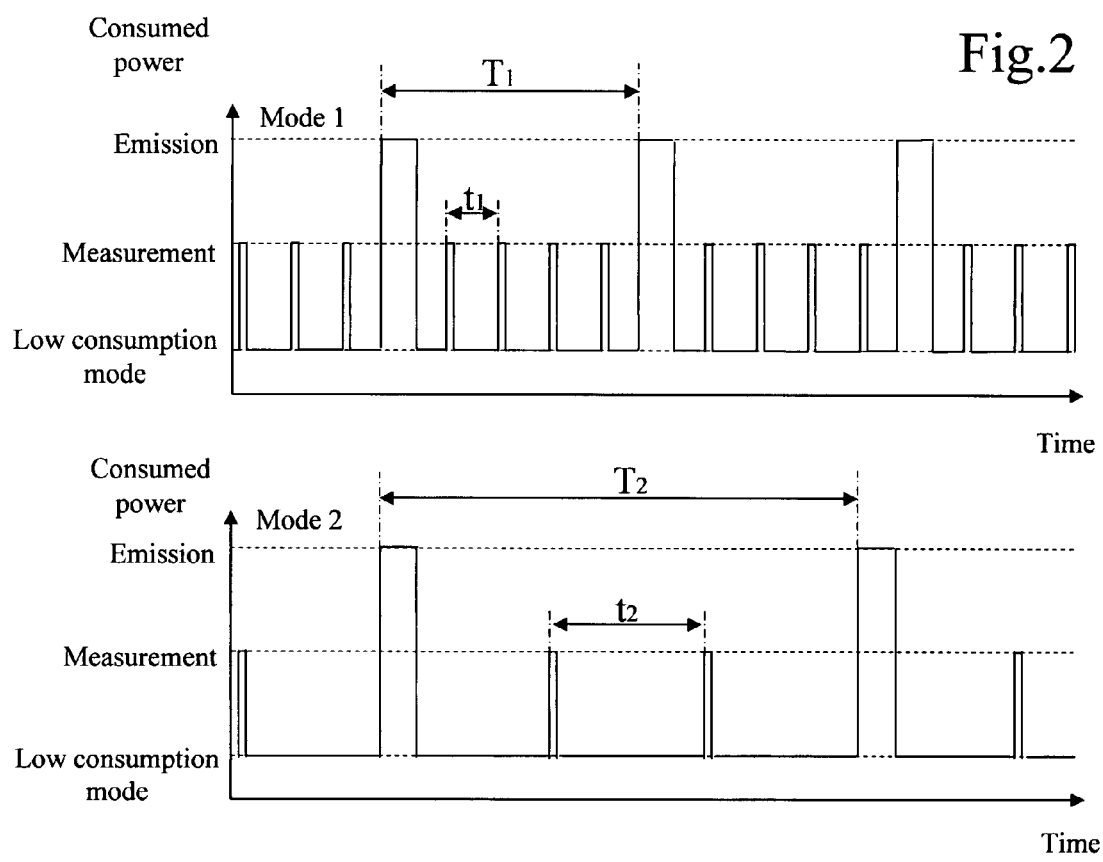
FIG. 2 is a plot showing the activity of the self-powered home automation sensor device in two different modes of operation.
Figures 3, 4:
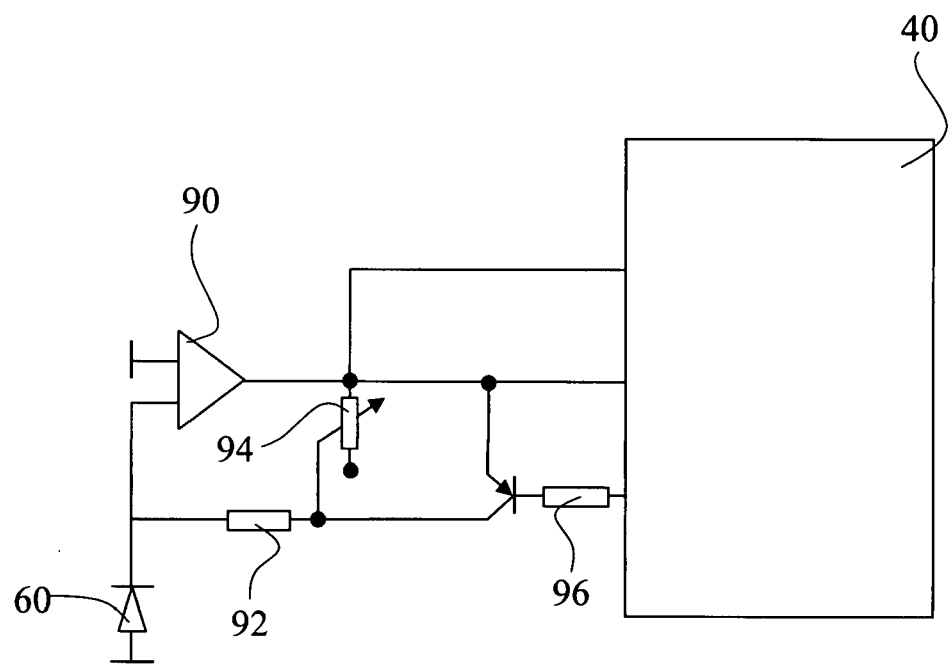
FIG. 3 is a table showing the behaviour of the self-powered home automation sensor device in two different modes of operation.
FIG. 4 is a diagram in partial detail of one embodiment of a self-powered home automation sensor device according to invention.

The two modes of operation are described in greater detail in FIGS. 2 and 3. In the preferred embodiment in which the conversion means is a photovoltaic cell and in which one of the sensors is a photodiode, this sensor is used to determine the instantaneous power that can be converted into electrical energy. If this instantaneous power, or a value defined on the basis of a sample of measured power levels (for example an overall average), is above a threshold, that is to say if the illumination measured by the photodiode is above a predetermined threshold, the sensor device operates in a first mode. However, if this instantaneous power, or a value defined on the basis of a sample of measured power levels, is below a threshold, that is to say if the illumination measured by the photodiode is below this predetermined threshold, the sensor operates in a second mode.

In the first mode, the illumination is measured with a period $t_1$ by the photodiode (there is a period $t_1$ between a first measurement and a second subsequent measurement). The microcontroller then operates with a first clock frequency $f$, for example 32 kHz defining a period $t$. Between the measurements, the microcontroller is switched to a low-consumption state, for example in standby mode. In this mode, the ratio of the period of operation in the low-consumption state to the period of operation with the first clock frequency is greater than 50. When the self-powered home automation sensor device transmits a status signal via its transmitter, the microcontroller then operates with a second clock frequency $f'$ greater than the first, for example 2 MHz. The period $T_1$ separating two consecutive transmissions of a status signal may be at least ten times greater than that separating two different measurements ($T_1 > 10 \times t_1$). Preferably, the measurement of the instantaneous power that can be converted into electrical energy (making it possible to determine whether or not the device has to have its mode of operation changed) is carried out at the moment of sending the status signal.

In addition to these measurement and transmission actions, the self-powered home automation sensor device may transmit other signals via its transmitter, these signals containing data from measurements made by the sensors or data deduced by comparing these measurements with thresholds. For example, these signals may indicate the appearance or disappearance of the sun, in order consequently to actuate a solar protection device.

In the second mode, the self-powered home automation sensor device transmits only status signals and verifies if the condition for a change of operating mode is met.

In the second mode, the illumination is measured by the photodiode with a period t2 much longer than the period t1. Preferably, the period t2 is a multiple of the period t1. The frequency may even be zero. In this case, the illumination can only be measured when testing whether the condition for a change of operating mode is met. For the purpose of reducing the energy consumption in this period of low convertible power, the period T2 of transmitting the status signals is greater than that in the first mode. The number of frames transmitted in the status signal is also reduced.

Preferably, the period T2 is a multiple of the period T1. In this way, an old receiver belonging to a product range of a generation prior to the sensor device according to the invention can operate with this sensor device. This is because said receiver will consider the missing frames in the second mode of operation relative to the first mode of operation as being due to transmission errors. For example, a previous-generation receiver may be designed to operate with a previous-generation sensor device transmitting every 15 minutes, the receiver considering the sensor device as it is operational, if it receives a signal at least every 45 minutes. It should be noticed that if the sensor device according to the invention transmits every 15 minutes in a first mode and every 30 minutes or every 45 minutes in a second mode, it can operate so as to be compatible with the previous-generation receiver.

Preferably, it is advantageous to adapt the conditions for charging the energy storage means to the amount of energy that can be converted into electrical energy. Thus, in a preferred method of implementation, the conditions for charging the storage means depend on the mode of operation of a self-powered home automation sensor device. In the first mode of operation, the storage means is charged via a voltage step-up converter or directly from the energy conversion means depending on the level of charge of the storage means. In the second mode of operation, the conversion means is always charged directly from the energy conversion means.

A circuit for determining the instantaneous power that can be converted into electrical energy is described with reference to FIG. 4. In the case described, the solar energy is used to charge the electrical energy storage means and the conversion means 20 (not shown) is a photovoltaic panel. A sensor comprises a photodiode 60, which is also used as means 80 for determining the instantaneous amount of energy that can be converted into electrical energy. This circuit is controlled by the microcontroller 40. An operational amplifier 90 is used to amplify the short-circuit current of the photodiode 60. The voltage across the terminals of a resistor 92 and of a variable resistor 94 that are placed in series between an input and the output of the operational amplifier is compared with a threshold voltage by the microcontroller. This makes it possible, for example, to detect the appearance and disappearance of the sun. The variable resistor may be adjusted for this purpose. A transistor 96 is connected in parallel with the variable resistor and its "on" or "off" state corresponds, after adjusting the variable resistor, to the presence or absence of the sun.

Document U.S. Pat. No. 4,695,785, the content of which is incorporated by reference in the present application, gives for example another embodiment of the determination means 80 that could be used without departing from the scope of the invention.

Thanks to the invention, it is possible to better anticipate autonomy management by determining the amount of energy that can be converted into electrical energy and by consuming electrical energy adapted to these determined amounts.

In FIG. 1, the link 100 shown by the dotted lines between the energy conversion means 20 and the determination means 80 indicates that, in one embodiment, the functions of these means may be provided by a single element. The link 110 shown by the dotted line between the detection means 60 and the determination means 80 indicates that, in one embodiment, the functions of these means may be provided by one and the same element.

What is claimed is:

1. A method of operating a self-powered home automation sun or wind sensor device for detecting the existence and/or for measuring the intensity of a first physical phenomenon, comprising a means for converting an effect of a second physical phenomenon into electrical energy in order to supply the device and a means for determining the instantaneous power of the second physical phenomenon that can be converted into electrical energy, wherein a normal, first mode of operation of the device or an energy-saving second mode of operation of the device is activated according to a value defined on the basis of the determination of the instantaneous power that can be converted into electrical energy, wherein, in the second mode of operation, the self-powered home automation sensor device transmits only status signals, wherein the transmission of the status signals is periodic, and verifies if a condition for a change of operating modes is met, the device having a lower electrical consumption in the second mode than in the first mode.

2. The operation method as claimed in claim 1, wherein the first and second physical phenomena are identical.

3. The operating method as claimed in claim 1, wherein the frequency of measurement of the intensity of the first physical phenomenon is greater in the first mode of operation than in the second mode of operation.

4. The operating method as claimed in claim 1, wherein one or more status signals are transmitted at a greater frequency in the first mode of operation than in the second mode of operation.

5. The operating method as claimed in claim 1, wherein each of the status signals comprises a number of frames, the number of frames transmitted in each of the status signals being greater in the first mode of operation relative to the second mode of operation.

6. The operating method as claimed in claim 1, wherein in the first mode of operation a processing logic unit operates at a frequency above that at which it operates in the second mode of operation.

7. The operating method as claimed in claim 1, wherein a transmission by the device occurs only when the intensity of the first physical phenomenon meets a predetermined criterion.

8. The operating method as claimed in claim 7, wherein the predetermined criterion may be redefined by the user.

9. The operating method as claimed in claim 1, wherein, in the first mode of operation, an electrical energy storage means is charged by a step-up converter or directly from the energy conversion means depending on the level of charge of the storage means.

10. The operating method as claimed in claim 1, wherein, in the second mode of operation, an electrical energy storage means is permanently charged directly from the conversion means.

11. A self-powered home automation sensor device which comprises hardware means and software means for implementing the operating method defined in claim 1.

12. The operation method as claimed in claim 1, wherein a measurement of the instantaneous power that can be converted into electrical energy is made at the time of the status signal transmission, and used for determining if a change of mode is necessary.

* * * * *